(12) United States Patent
Gustafsson et al.

(10) Patent No.: US 7,024,168 B1
(45) Date of Patent: Apr. 4, 2006

(54) CONTROLLED ANTENNA DIVERSITY

(75) Inventors: Kjell Gustafsson, Lund (SE); Torsten Carlsson, Lund (SE); Torgny Palenius, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/348,494

(22) Filed: Jul. 7, 1999

(51) Int. Cl.
*H04B 17/20* (2006.01)

(52) U.S. Cl. .................... 455/135; 455/101; 455/277.1

(58) Field of Classification Search ........ 455/132–135, 455/137, 139, 273, 276.1, 277.1, 277.2, 522.1, 455/69, 574, 343, 552.1, 343.1, 101
See application file for complete search history.

(56) References Cited

U.S. PATENT DOCUMENTS

| | | | |
|---|---|---|---|
| 3,806,937 A * | 4/1974 | Lindley | 342/424 |
| 4,823,398 A * | 4/1989 | Hashimoto | 455/134 |
| 5,280,637 A * | 1/1994 | Larosa et al. | 455/134 |
| 5,361,404 A | 11/1994 | Dent | |
| 5,561,851 A * | 10/1996 | Hubbell et al. | 455/54.1 |
| 5,566,364 A * | 10/1996 | Mizoguchi et al. | 455/132 |
| 5,687,194 A | 11/1997 | Paneth et al. | |
| 5,818,543 A * | 10/1998 | Lee | 348/725 |
| 5,819,182 A * | 10/1998 | Garner et al. | 524/275 |
| 5,983,086 A * | 11/1999 | Tsukuda | 455/132 |
| 5,983,100 A * | 11/1999 | Johansson et al. | 455/426 |
| 6,009,307 A * | 12/1999 | Granata et al. | 455/13.3 |
| 6,137,994 A * | 10/2000 | Alterman et al. | 455/69 |
| 6,185,266 B1 * | 2/2001 | Kuchi et al. | 375/347 |
| 6,256,484 B1 * | 7/2001 | Conner et al. | 455/137 |

FOREIGN PATENT DOCUMENTS

| | | |
|---|---|---|
| EP | 0 454 368 | 10/1991 |
| EP | 0 454 585 | 10/1991 |
| EP | 0 593 822 | 4/1994 |
| EP | 0 735 702 | 10/1996 |
| JP | 07015380 A * | 1/1995 |
| JP | 411055168 A * | 2/1999 |
| WO | WO 93/06668 | 4/1993 |
| WO | WO 95/11552 | 4/1995 |
| WO | WO/9509494 | 4/1995 |
| WO | WO 95/33312 | 12/1995 |
| WO | WO 98/58462 | 12/1998 |

OTHER PUBLICATIONS

Sayeed, Zulfiquar, "Throughput Analysis and Design of Fixed and Adaptive ARQ/Diversity Systems for Slow Fadings Channels." IEEE Global Telecommunications Conference, 1998, pp. 3686-3691.

Sayeed, Zulfiquar, "Throughput Analysis and Design of Fixed and Adaptive ARQ/Diversity Systems for Slow Fadings Channels." IEEE Global Telecommunications Conference, 1998, pp. 3686-3691, no month listed.

* cited by examiner

*Primary Examiner*—Marsha D. Banks-Harold
*Assistant Examiner*—Nghi H. Ly
(74) *Attorney, Agent, or Firm*—Potomac Patent Group PLLC

(57) ABSTRACT

A mobile station with a receiver having antenna diversity where the diversity processing is controlled from the base band processing circuit and only turned on when the performance gain justifies extra power consumption. The base band processing circuit may be instructed by the network that it can cease diversity reception after evaluating cell leads within a system.

6 Claims, 4 Drawing Sheets

CONTROLLED ANTENNA DIVERSITY

BACKGROUND

1) Field of the Invention

The present invention pertains to systems and methods involved in radio communication systems and, more particularly, to a system and method for controlling antenna diversity.

2) Discussion of Related Art

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

FIG. 1 illustrates an example of a conventional cellular radio communication system 100. The radio communication system 100 includes a plurality of radio base stations 170a–n connected to a plurality of corresponding antennas 130a–n. The radio base stations 170a–n in conjunction with the antennas 130a–n communicate with a plurality of mobile terminals (e.g. terminals 120a, 120b and 120m) within a plurality of cells 110a–n. Communication from a base station to a mobile terminal is referred to as the downlink, whereas communication from a mobile terminal to the base station is referred to as the uplink.

The base stations are connected to a mobile telephone switching office (MSC) 150. Among other tasks, the MSC 150 coordinates the activities of the base stations, such as during the handoff of a mobile terminal from one cell to another. The MSC 150, in turn, can be connected to a public switched telephone network 160, which services various communication devices 180a, 180b and 180c.

A common problem which occurs in cellular radio communication systems is the loss of information in the uplink and downlink signals as a result of multi-path fading. Multi-path fading occurs when the transmitted signal travels along several paths between the base station and the intended receiver. When the differences in the path lengths between the base station and the mobile terminal are relatively small, the multiple signal images arrive at almost the same time. The images add either constructively or destructively, giving rise to fading, which can have a Rayleigh distribution. When the path lengths are relatively large, the transmission medium is considered time dispersive, and the added images can be viewed as echoes of the transmitted signal, giving rise to intersymbol interference (ISI).

Fading can be mitigated by using multiple receive antennas and employing some form of diversity combining, such as selective combining, equal gain combining, or maximal-ratio combining. Diversity takes advantage of the fact that the fading on the different antennas is not the same, so that when one antenna has a faded signal, chances are the other antenna does not. ISI multi-path time dispersion can be mitigated by some form of equalization, such as linear equalization, decision feedback equalization, or maximum likelihood sequence estimation (MLSE).

Interference can also degrade the signals transmitted between a base station and mobile terminals. For instance, a desired communication channel between a base station and a mobile terminal in a given cell can be degraded by the transmissions of other mobile terminals within the given cell or within neighboring cells. Other base stations or RF-propagating entities operating in the same frequency band can also create interference (e.g., through "co-channel" or "adjacent channel" interference in systems).

Frequency re-use can be used to, among other things, mitigate interference by placing interfering cells as far from each other as possible. Power control can also be used to reduce the interference by ensuring that transmitters communicate at minimal effective levels of power. Such power control techniques are especially prevalent in code-division multiple access (CDMA) systems, due to the reception of information in a single frequency channel at each base station.

The performance of individual radio links as well as the overall system is improved by antenna diversity in the mobile station and/or base station receiver. Having multiple antennas, and processing the information accordingly, helps combat fading and makes the communication link more robust. The price of introducing antenna diversity is the extra radio and base band processing resulting from having more than one signal to demodulate. This price in a mobile station has often been judged to be too large in terms of the increased space, manufacturing costs, and power consumption due to the extra components required.

Currently, one cellular system uses antenna diversity in the mobile station. Specifically, in the Japanese system PDC this form of diversity is normally limited to a version called "selection" diversity. In this case, as shown in FIG. 2, one antenna is used at a time. In FIG. 2, a first antenna 210 and a second antenna 212 each receive radio signals, including the radio signals from the same source but perhaps different paths. One of the two received radio signals is selected by a selection switch 220 for input to a Radio Frequency (RF) processor 230. The RF processor 230 down converts the received signal and performs other processing before the processed signal reaches a base-band processor 240. The base band processor 240 controls the operation of the RF processor 230. The base band processor 240 also provides a control signal to the selection switch 220 for controlling which antenna signal to process based on criterion such as measured signal strength. This selection as to which antenna used is based on criteria such as, for example, a measurement of the receive signal strength just before receive slot in a TDMA system.

On one hand, this version of antenna diversity does not fully exploit all that can be gained from the performance of combining signals from these two antennas. On the other hand, it avoids the cost in terms of extra components and power consumption, resulting from full processing of both antenna signals.

In International Patent Application WO 95/11552, a diversity receiver having two receiver branches is shown. A control signal based on comparison between signal strengths of the received signals is generated. Switching means are arranged to change-over a signal from either one of the receiver branches to a receiver output in dependence of the control signal. Hence, this is an example of a "selective" diversity system.

In European Patent Application 0,454,585, a diversity selection system switches between diversity antennas for every assigned time slot in a TDMA system to provide better signal quality according to a prediction algorithm. Hence, this patent is yet another example of a selective diversity system.

New systems for example IMT 2000 are being defined in a way where diversity is more or less necessary to meet some of the specific performance requirements. The overall criteria is to meet some kind of performance measure for the communication link. This can be monitored in any one of several ways. For example, one can measure the signal-to-noise ratio (SNR) of the received signal, one can measure or estimate a bit error rate (BER) or frame error rate (FER), or one can keep track of the number of required re-transmissions in cases where the radio link protocol uses re-transmissions. In most cases, this will require more complete implementation of diversity than selection diversity currently offers. Specifically, both antenna signals will need to be fully processed and the process signals combined in the most beneficial manner.

FIG. 3 is an example of such a system. In FIG. 3, a first antenna 310 receives radio signals and provides its received signals to a first RF processor 330. A second antenna 312 receives radio signals and provides its received signals to a second RF processor 332. The first RF processor 330 processes, e.g., down converts, the received RF signal to an intermediate signal for input to a base band processor 340. The first RF processor 330 also processes signals to be transmitted, including up converting the signal to a radio frequency for transmission over the first antenna 330.

Simultaneous with the processing of the first RF signal in the first RF processor 330, the second antenna 312 receives the same signal from the same source, but perhaps over a different radio path. This second signal is processed (e.g., down converted) in the second RF processor 332. The second signal is processed in the second signal processor 332 before being forwarded to the base band processor 340. The second RF processor 332 operates only in a receive mode.

The need for a lot of extra processing when using diversity is particularly true for systems based on CDMA, since in this case the antenna signal has to pass through most of the base band processing before the quality thereof can be judged. Simple measurements like signal strength do not give enough information about one individual user signal.

Although antenna diversity may be needed in some situations, there will be other cases where the radio environment allows perfectly adequate performance without diversity. If diversity is implemented such as shown in FIG. 3, the mobile station ends up spending power on the diversity processing whether necessary or not. This leads to shorter operating time for battery operated devices that could have been achieved without the power consumption in the diversity chain.

SUMMARY AND OBJECTS OF THE INVENTION

The present inventors have reduced the power penalty of introducing diversity in the mobile station by using the diversity branch only when needed. FIG. 4 depicts a solution where the diversity branch can be controlled (i.e., switched on or off) by the base band processing circuitry. In this way, it can be decided when the performance gain from using diversity outweighs the extra power consumption and then switch to the diversity processing only in the latter situation.

The criteria for when to use the diversity branch can be both global in the sense of it being system wide and/or local. In the global case the network evaluates the load on different cells and the network signals the mobile stations when the mobile stations are allowed to switch off the diversity processing. Some of the performance loss is then compensated by increasing the transmit power on the down link to the mobile station, in one embodiment of the present invention. More specifically, power will likely increase to reach a target Signal to Interference Ratio (SIR) in one loop, and possibly a target SIR will be adjusted based perceived quality in an outer loop.

In the local case, the mobile station itself decides when it wants to use diversity. This decision can be based on current radio performance, the type of services currently used and/or the remaining battery power, for example.

When not using diversity, the mobile station generally needs a higher SIR (Signal to Interface ratio) to be reached. Whether this request is granted or not depends on the current load in the system. There will be cases when the power cannot be increased and the mobile may be forced to renegotiate the currently used services (data rates, packet length, etc.) in order to handle the reduced SIR when switching off the diversity processing.

BRIEF DESCRIPTION OF THE DRAWINGS

The foregoing objects, features and advantages of the present invention, as well as other features, will be more clearly understood upon reading the following detailed description in conjunction with the drawings in which.

DETAILED DESCRIPTION

In the following description, for purposes of explanation and not limitation, specific details are set forth such as particular circuit components, techniques, etc. in order to provide a thorough understanding of the present invention. However, it will be apparent to one skilled in the art that the present invention may be practiced in other embodiments that depart from the specific details. In other instances detailed descriptions of known methods, devices and circuits are omitted so as not to obscure the description of the present invention.

Figure 1:
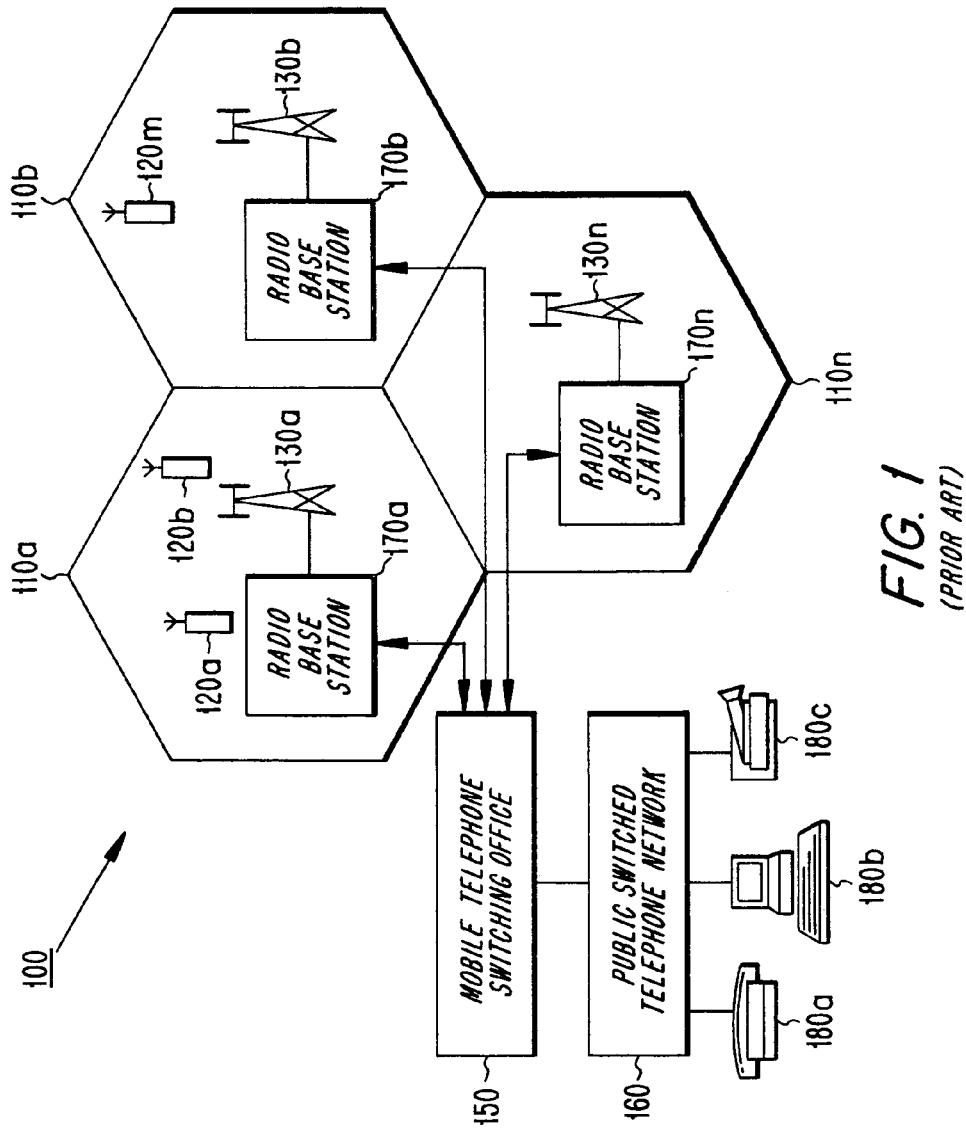
FIG. 1 shows a conventional radio communication system including plural base stations and a mobile telephone switching office.
Figure 2:
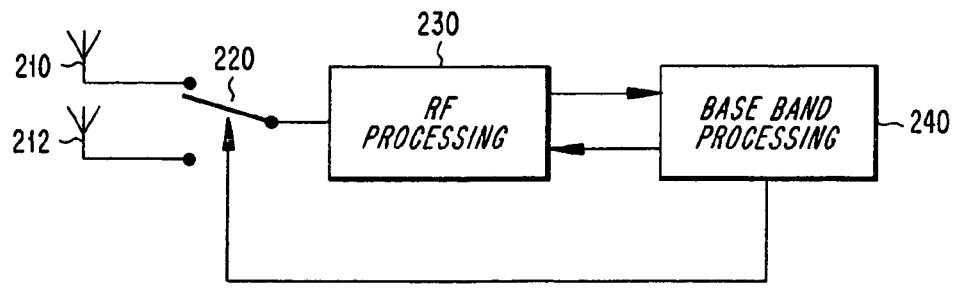
FIG. 2 shows a conventional selection diversity communication system using a criteria such as the measured signal strength to decide which antenna signal to process.
Figure 3:
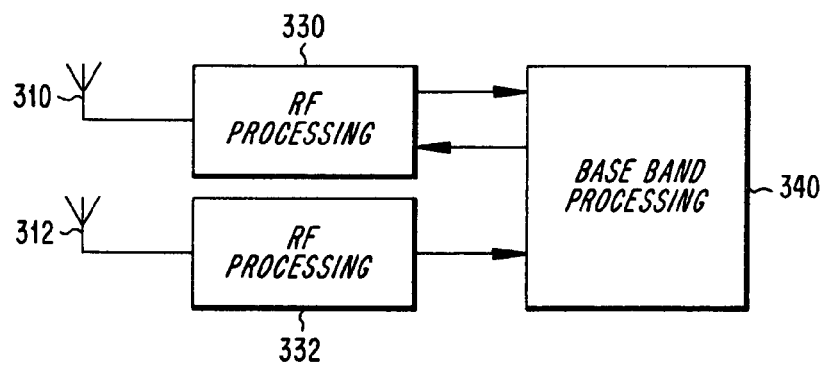
FIG. 3 shows a conventional mobile station having diversity with complete processing in both received signals.
Figure 4:
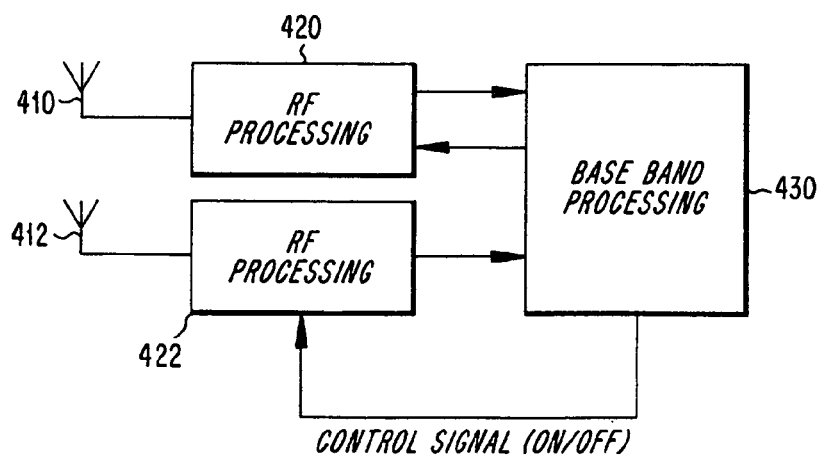
FIG. 4 is an example of the present invention of a receiver with an antenna diversity where the diversity processing is controlled from the base band processing and is turned on when the performance gain justifies the extra power consumption.

FIG. 4 is a block diagram of a portion of a cellular telephone mobile or base which includes a first antenna 410 and a second antenna 412. The first antenna 410 receives a radio signal for input to a first Radio Frequency (RF) processor 420. The radio frequency processor 420 processes the received RF signals such as down converting the RF signal into a base band received radio signal. While only two antennas and processors are shown, more than two could be employed using the teachings of the present inventors as presented herein. The converted, base band radio signal processed by the RF processor 420 is input to a base band processor 430 for further processing in accordance with CDMA, TDMA, FDMA or other access systems.

Further, the RF processor 420 receives baseband signals from the base band processor 430 for up conversion into radio frequencies to be transmitted over the first antenna 410.

Radio signals are also received on the second antenna 412. This second antenna 412 may receive the same signals originating from the same signal source, but perhaps via a different signal path.

The received signals from the second antenna 412 are input to a second RF processor 422 for radio frequency processing such as down conversion into a base band signal. The down converted base band signal processed by the RF processor 422 is then input to a base band processing circuit 430. The second radio frequency processor 422 is not used in the transmission mode.

The base band processor 430 may be any suitable circuitry for processing base band radio frequencies and is envisioned to be in the form of an application specific integrated circuit (ASIC). Naturally, any type of base band processing can be used, such as for FDMA, TDMA, or CDMA. The present invention is particularly useful for CDMA applications, but is not so limited.

The base band processor 430 also performs the additional function of determining when antenna diversity is justified in light of the additional power consumption thereof.

Figure 5:
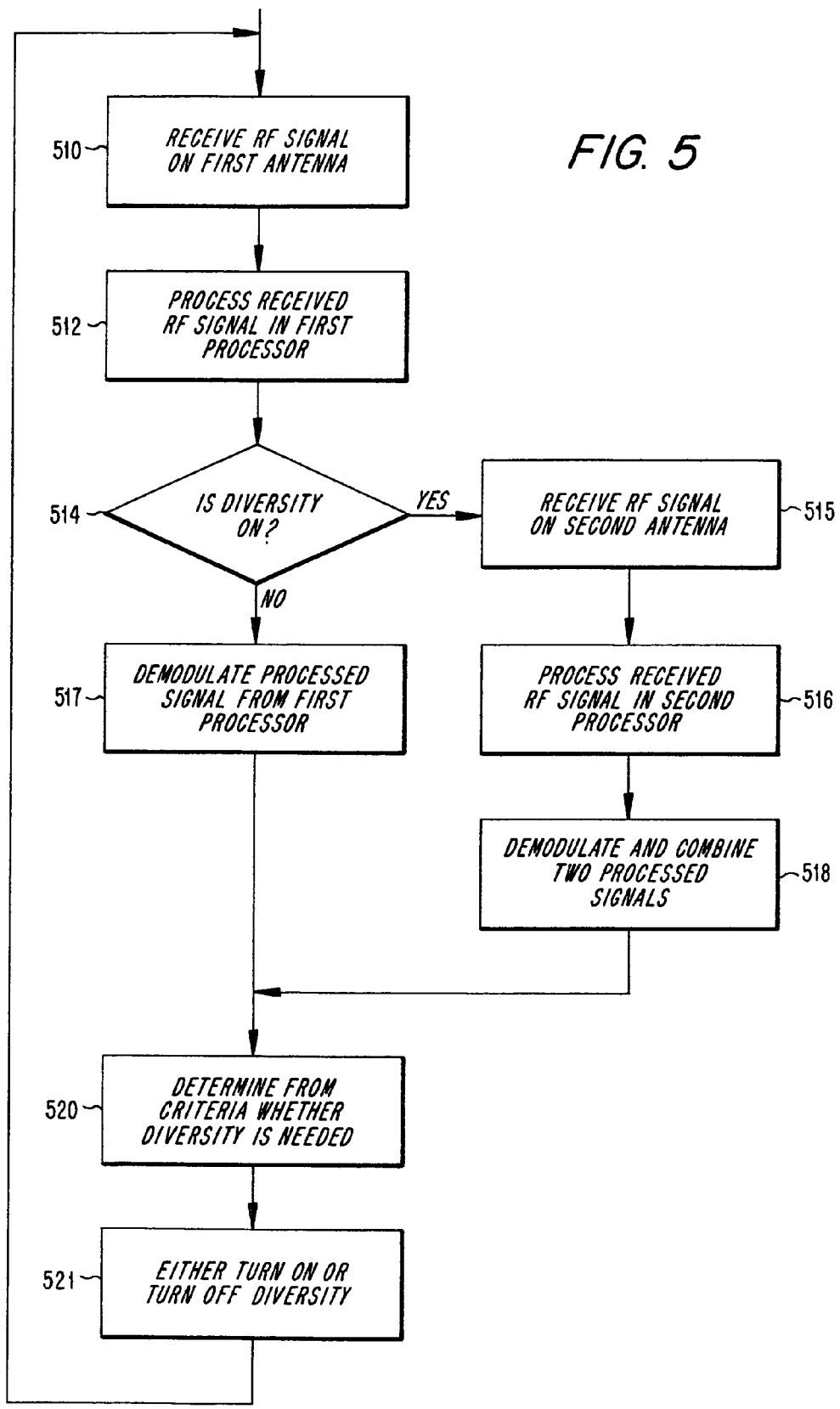
FIG. 5 is a flow chart showing the operation of a control portion of the base band processor shown in FIG. 4.

FIG. 5 shows the general program flow of a control section of a base band processing. This control section provides the control signal to the second RF processor 422. FIG. 5 is to be taken as an exemplary flow chart. Naturally, other program flows can be implemented without departing from the spirt and scope of the present invention.

A first step 510, a radio frequency signal is received in the first antenna 410. It is input for processing in the first RF processor 420 in the second step 512 which, among other processes, converts the radio frequency signal to a base band signal. At step 514, the base band processor 430 checks to determine whether diversity is on. If diversity is on, then the RF signal received on the second antenna at step 515 is processed in the second processor 422 at step 516. The signal processed in the second processor 422 is then demodulated and the two processed signals are combined in the base band processor 430 at step 518. If at step 514 it is determined that diversity is off, then the signal from the first processor 420 is demodulated at step 517 for further processing in other circuit elements, such as a digital signal processor (DSP). Further processing will be necessary for such implementations as CDMA, TDMA and FDMA systems to convert the base band signal into a voice signal or data signal, as the situation makes appropriate. The two branches of the process then combine and at step 520 the base band processor 430 determines whether diversity should be on and either turn on or turn off diversity at step 521.

This determination as to whether the performance gain of the intended diversity justifies the extra power consumption can employ a number of different mechanisms. The determination can be made at the mobile station or the mobile station can send information about the quality of the link to the base station. If the base station judges that the quality of the link is sufficiently good and also has spare capacity then it allows diversity to be switched off in the mobile station.

There are two general types of post detection selection diversity receivers available. In the first type, the selection of one of the received signals is dependent upon the received signal strength (RSS) of the signals. This type of diversity receiver is known as the level comparison diversity technique. The selection of the second type is dependent upon the phase error estimates. This type of post detection selection diversity receiver is known as a phase likelihood comparison technique, as more fully explained in WO 93/06668 herein incorporated by reference. Diversity is then turned on or off based on this determination, and the process returns to the initial step 510.

In the level comparison diversity technique, the RSS of each receive signal is detected and compared to others. The received signal having the RSS is selected or used by the radio telephone. This simple system is relatively effective in signal fading environment and is a superior system having a single antenna receiver. However, the level of comparison diversity technique does not offer any advantage over a single antenna system in a static environment. The phase likelihood comparison technique utilizes a phase error estimate for each of the received signals, selecting the signal with the smallest estimated phase error.

Other systems can be employed, such as the TDMA system wherein a prediction or signal quality is carried out according to the receive signal level of the two antennas and the slope of these signals from each antenna just before the assigned time slot in the TDMA system.

Another mechanism is to measure the signal to interference ratio (SIR), or estimate a bit error rate (BER) or frame error rate (FER), or keep track of the number of re-transmissions in cases where the radio link protocol uses re-transmissions, at the antennas in the base band processor 430 to determine which is appropriate.

As mentioned above, if diversity is being used, then the signals from the first and second antennas 410 and 412, as processed in the first and second RF processors 420 and 422, are combined. Combining signals of different antennas by an intermediate frequency gain combination technique, where the detection frequency signals for the radio frequency parts are phased with each other and summed as known from WO 95/11552 herein incorporated by reference. Phasing takes place by adjusting the frequency phase of the output signal of the local oscillator to the second receiver branch. In practical application, this is often done by processing the two signals separately and forming channel estimates for them separately. By then, using the individual channel estimates for the two signals, one will adjust for the other the difference (e.g., phase) in the channel and then add the data. The data is often added together using different weights depending on the quality of the two respective signals.

As the signals are summed coherently, noise is incoherently combined and the signal to noise ratio improves in the diversity receiver. The combined signals are then output to other circuitry for further processing to ultimately result in a voice or data signal.

If diversity is not needed, then the second RF processor 422 is not used. When not using diversity, the mobile station generally needs a higher SIR at the antenna to get the same performance as when using diversity. Most modern cellular systems include a power control in the forward link. The mobile system will ask the base station to increase its transmit power until the required SIR is reached. Whether this request is granted or not depends on the current load of the system. There will situations when the power cannot be increased and the mobile stations may be forced into renegotiating currently used services, such as data rates, channel coding, etc. in order to handle the reduced SIR when switching off the diversity processing. Alternatively, the mobile station can be forced to continue diversity processing at the increased power consumption.

Figure 6:
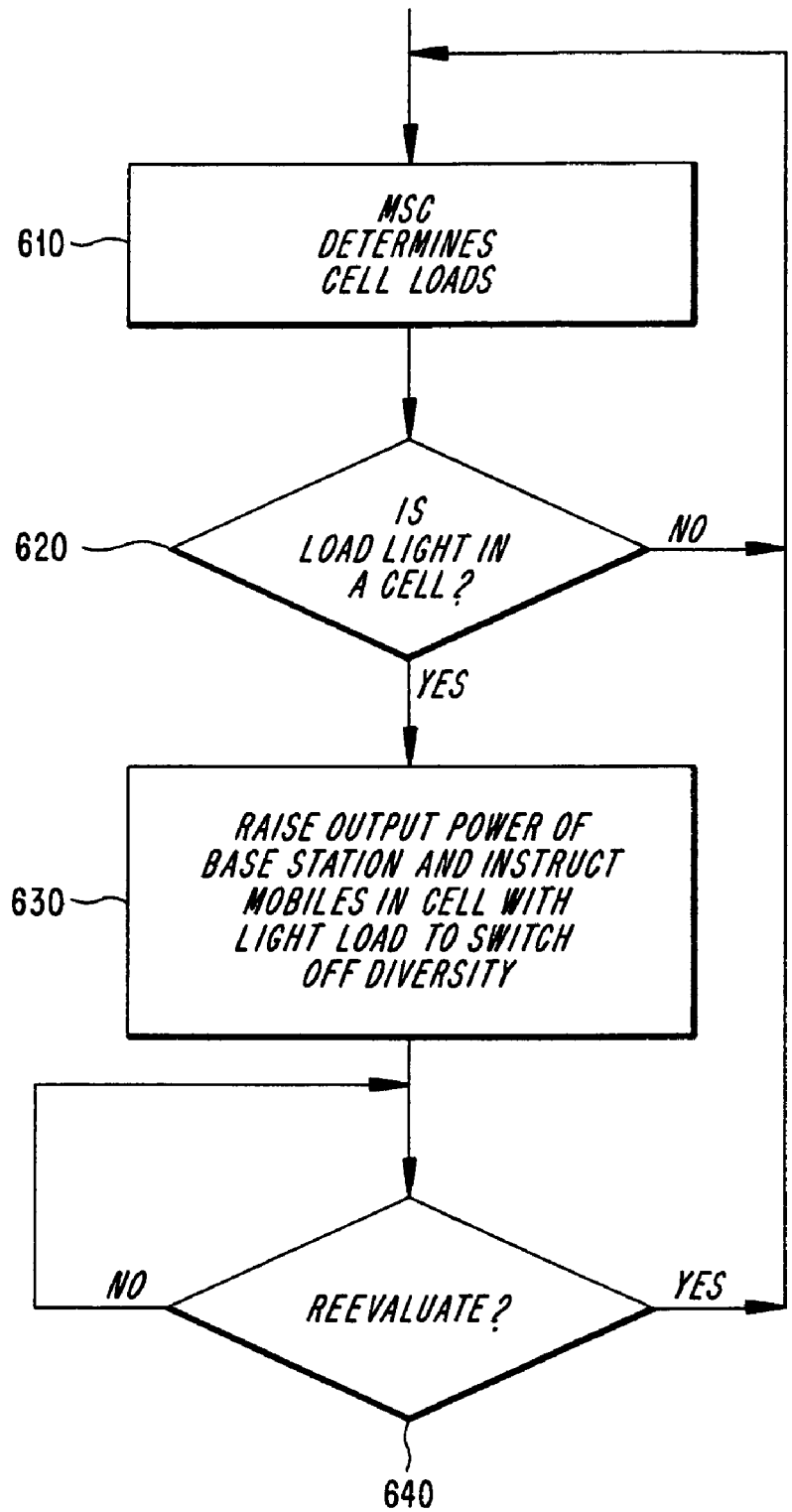
FIG. 6 is a flow chart showing the operation of a different embodiment of a control portion of the base band processor.

In addition or as an alternative to local control, the criteria for when to use a diversity branch can be global. In the global control criteria, the network evaluates the load in different cells and signals to the mobiles when they are allowed to switch off diversity processing. As illustrated in FIG. 6, at step 610, a network determines the loads on various cells in a cellular system. If the load of a cell is determined to be light at step 620, there is excess capacity. This means that some of the capacity can be exploited to make some mobile stations perform well without diversity, such as by raising the base station output power for these links at step 630. Then, at step 630, the network signals the mobile stations that they are allowed to switch off diversity processing in some of the less congested cells. While some of the performance is lost when diversity is turned off, it can be compensated for by increasing the transmit power in the forward link to the mobile station to reach a target SIR in one loop and possibly adjust the target SIR based on perceived quality in an outer loop. This can be done by having the mobile station inform the base station that it has switched off diversity, thus triggering an increase in base station output power. Alternatively, the base station power can be ramped up or down after instructing a mobile station to switch off diversity until the output is again at the performance requirement of the transmission. More specifically, a mobile station that operates with diversity needs, on average, less Signal to Interference Ratio (SIR) to decode a received signal with a good result than a mobile station that operates with one antenna. The mobile normally has an internal target SIR to which it aims to operate. This target SIR reflects a signal quality needed to sufficiently decode the incoming signal. There is a power control loop between the mobile and the base station and if the mobile experiences lower SIR than the target value, it will request the base station to increase the base station output power; and if the SIR is higher than the target, it will request the base station to decrease its output power. There is also a slower outer loop that checks the final quality of the decoded signal; and if the final quality of the decoded signal is too good/bad; the target SIR will be updated accordingly. The base station may or may not impose restrictions on which target SIR a mobile station may ask for (in order to hinder a mobile from requesting too much base station output power and thus take too much of the total capacity).

Given this, the two modes (with and without diversity) will correspond to two different target SIRs. If it is decided in the mobile station to switch off diversity, then it will start by increasing its internal target SIR. This action will lead to power control commands to the base station forcing it to increase its output power so that the SIR experienced at the mobile reaches the new (higher) target value. This leads to better quality in the demodulated signal (measured as BER, FER, SIR, retransmission rate, etc.). If the demodulated signal is good enough, the mobile station switches off the second antenna. The opposite will happen when diversity is switched on. First, the second antenna is switched on. The resulting decoded signal quality is monitored, then the target SIR is decreased and accordingly, the base station will lower its output power.

The global control scheme being described could simply be the system checking how the different cells are loaded and whether the signal to the mobile stations were allowed to use the higher or the lower SIR target (corresponding to diversity on or off). The local mode could be the mobile using any measure to determine whether or not to try to switch off diversity and see (through different quality measurements) if the base station has increased power according to the new target SIR.

These two control loops (power control to reach a target SIR, and then an outer loop to adjust target SIR based on perceived quality) are how the WCDMA 3GPP standard will operate.

As shown in step 640, the system then determines whether reevaluation is appropriate and, if it is, returns to step 610.

Thus, FIG. 5 illustrates local control in the mobile station for deciding when it is appropriate to use diversity, and FIG. 6 shows the flow of when the network is to decide to use diversity in mobile stations. Naturally, it is possible to use both the local control and the network control, global control at the same time.

What is claimed is:

1. A mobile station comprising:
    a first antenna;
    a first radio frequency processing circuit receiving and processing signals from said first antenna;
    a second antenna;
    a second radio frequency processing circuit receiving and processing signals from said second antenna; and
    a base band processing circuit receiving processed radio frequency signals from said first radio frequency processing circuit and from said second radio frequency processing circuit for diversity, and providing a control signal to said second radio frequency processing circuit to selectively activate and deactivate said second radio frequency processing circuit based on a determination as to whether diversity is appropriate, wherein said control signal generated by said base band processing circuit is controlled by a control signal from a base station with which said mobile station is in communication.

2. A mobile station in accordance with claim 1 wherein the base station will increase or decrease its output power to said mobile station after transmitting said control signal until a sufficient signal quality of the communication link.

3. A mobile station comprising:
    a first antenna;
    a first radio frequency processing circuit receiving and processing signals from said first antenna;
    a second antenna;
    a second radio frequency processing circuit receiving and processing signals from said second antenna; and
    a base band processing circuit receiving processed radio frequency signals from said first radio frequency processing circuit and from said second radio frequency processing circuit for diversity, and providing a control signal to said second radio frequency processing circuit to selectively activate and deactivate said second radio frequency processing circuit based on a determination as to whether diversity is appropriate, wherein said mobile station informs a base station of its deactivation of diversity so that the base station will adjust its output power until a sufficient signal quality is achieved in accordance with the non-diversity mode.

4. A method of controlling diversity in a mobile station, comprising:
    receiving a radio signal on a first antenna;
    processing radio signals from said first antenna in a first radio frequency processing circuit;
    receiving radio signals in a second antenna;
    processing radio signals from the second antenna in a second radio frequency processing circuit;
    receiving processed radio frequency signals from said first radio frequency processing circuit and from said second radio frequency processing circuit for diversity in a base band processing circuit;

determining whether diversity is appropriate; and providing a control signal to said second radio frequency processing circuit to selectively activate and deactivate said second radio frequency processing circuit based on said determination as to whether diversity is appropriate, further comprising controlling the generation by said base band processing circuit of said control signal by a control signal from a base station with which said mobile station is in communication.

5. A method in accordance with claim 4 further comprising adjusting an output power of the base station to said mobile station after transmitting said control signal until a sufficient signal quality of the communication link.

6. A method of controlling diversity in a mobile station, comprising:

receiving a radio signal on a first antenna;

processing radio signals from said first antenna in a first radio frequency processing circuit;

receiving radio signals in a second antenna;

processing radio signals from the second antenna in a second radio frequency processing circuit;

receiving processed radio frequency signals from said first radio frequency processing circuit and from said second radio frequency processing circuit for diversity in a base band processing circuit;

determining whether diversity is appropriate; and providing a control signal to said second radio frequency processing circuit to selectively activate and deactivate said second radio frequency processing circuit based on said determination as to whether diversity is appropriate, further comprising said mobile station informing a base station of its deactivation of diversity so that the base station will adjust its output power until a sufficient signal quality is achieved in accordance with the non-diversity mode.

* * * * *